(12) United States Patent
Hagiwara et al.

(10) Patent No.: US 10,394,224 B2
(45) Date of Patent: Aug. 27, 2019

(54) FABRICATION MANAGEMENT SYSTEM AND FABRICATION MANAGEMENT CONTROL APPARATUS

(71) Applicant: FUJI XEROX CO., LTD., Tokyo (JP)

(72) Inventors: Hiroshi Hagiwara, Kanagawa (JP); Satoshi Tomita, Kanagawa (JP); Kazunori Onishi, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 53 days.

(21) Appl. No.: 15/699,387

(22) Filed: Sep. 8, 2017

(65) Prior Publication Data

US 2018/0259938 A1 Sep. 13, 2018

(30) Foreign Application Priority Data

Mar. 9, 2017 (JP) .................................. 2017-045144

(51) Int. Cl.
*G05B 19/4099* (2006.01)
*B33Y 30/00* (2015.01)
*B33Y 50/02* (2015.01)
*B29C 64/393* (2017.01)
*B29C 64/20* (2017.01)
(Continued)

(52) U.S. Cl.
CPC ........ *G05B 19/4099* (2013.01); *B29C 64/176* (2017.08); *B29C 64/20* (2017.08); *B29C 64/393* (2017.08); *B33Y 30/00* (2014.12); *B33Y 50/00* (2014.12); *B33Y 50/02* (2014.12); *G05B 2219/31151* (2013.01);
(Continued)

(58) Field of Classification Search
CPC ....... B29C 64/20; B29C 64/393; B33Y 30/00; B33Y 50/02; G05B 10/4099
See application file for complete search history.

(56) References Cited

U.S. PATENT DOCUMENTS 9,085,109 B2 * 7/2015 Schmehl ................ B33Y 10/00

FOREIGN PATENT DOCUMENTS

| JP | 2013-526429 A | 6/2013 |
| JP | 2015-150708 A | 8/2015 |
| WO | 2011/021672 A1 | 2/2011 |

OTHER PUBLICATIONS

Takahashi et al., FAV File Format Specification, Jul. 12, 2016, Fuji Xerox Co, v1.0. (Year: 2016).*

* cited by examiner

Primary Examiner — Mark A Connolly
(74) Attorney, Agent, or Firm — Sughrue Mion, PLLC (57) ABSTRACT

A fabrication management system includes a fabrication control apparatus and a fabrication management server. The fabrication control apparatus includes a composite fabrication unit that fabricates multiple fabricated members in a single process, and a controller that controls fabrication performed by the composite fabrication unit. The fabrication management server includes a designing section that, from fabrication information about multiple first fabricated members for which a fabrication request has been made, designs a second fabricated member that holds all the first fabricated members in a removable manner, and an instructing section that instructs fabrication to be performed in accordance with fabrication procedure information, the fabrication procedure information indicating a procedure for obtaining a finished fabricated object by assembling together the first fabricated members and the second fabricated member.

1 Claim, 9 Drawing Sheets

(51) Int. Cl.
*B33Y 50/00* (2015.01)
*B29C 64/176* (2017.01)
(52) U.S. Cl.
CPC .............. *G05B 2219/35134* (2013.01); *G05B 2219/49007* (2013.01); *Y02P 90/265* (2015.11)

FABRICATION MANAGEMENT SYSTEM AND FABRICATION MANAGEMENT CONTROL APPARATUS

CROSS-REFERENCE TO RELATED APPLICATIONS

This application is based on and claims priority under 35 USC 119 from Japanese Patent Application No. 2017-045144 filed Mar. 9, 2017.

BACKGROUND

Technical Field

The present invention relates to a fabrication management system, and a fabrication management control apparatus.

SUMMARY

According to an aspect of the invention, there is provided a fabrication management system including a fabrication control apparatus and a fabrication management server. The fabrication control apparatus includes a composite fabrication unit that fabricates multiple fabricated members in a single process, and a controller that controls fabrication performed by the composite fabrication unit. The fabrication management server includes a designing section that, from fabrication information about multiple first fabricated members for which a fabrication request has been made, designs a second fabricated member that holds all of the first fabricated members in a removable manner, and an instructing section that instructs fabrication to be performed in accordance with fabrication procedure information, the fabrication procedure information indicating a procedure for obtaining a finished fabricated object by assembling together the first fabricated members and the second fabricated member.

BRIEF DESCRIPTION OF THE DRAWINGS

Exemplary embodiment of the present invention will be described in detail based on the following figures, wherein:

FIGS. 5A to 5C illustrate a state in which first fabricated members, a second fabricated member, and a third fabricated member are integrated with each other, of which

FIGS. 9A and 9B each illustrate a group of components constituting a plastic model according to the exemplary embodiment, of which

DETAILED DESCRIPTION

Figure 1:
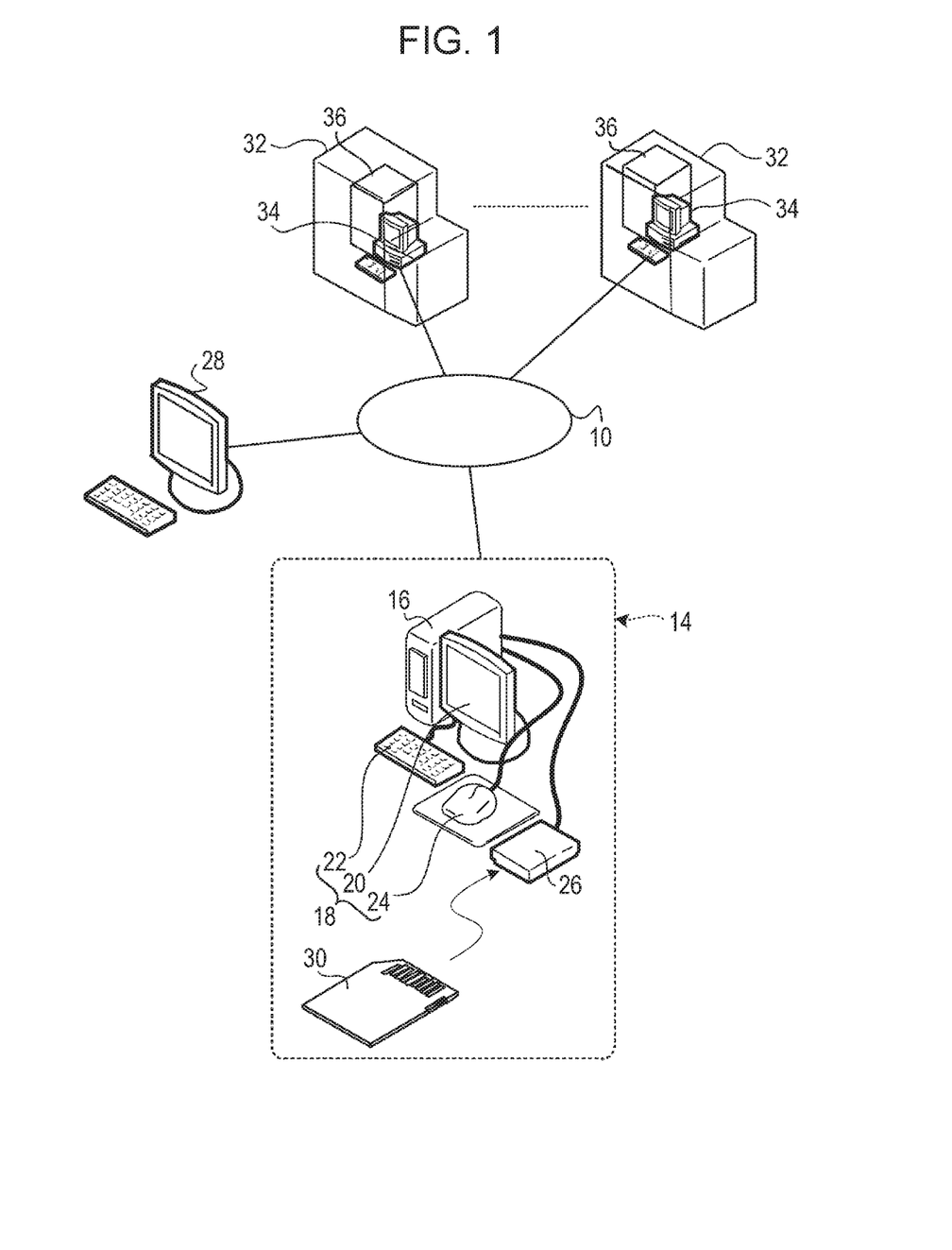
FIG. 1 schematically illustrates an overview of a fabrication management system according to an exemplary embodiment.

FIG. 1 schematically illustrates an overview of a fabrication management system including a fabrication-order-receipt management control apparatus 14 serving as a fabrication management server according to an exemplary embodiment.

A communication network 10 is connected with the fabrication-order-receipt management control apparatus 14. The communication network 10 is, for example, a local area network (LAN) or an Internet network. The communication network 10 may include multiple LANs connected by a wide area network (WAN). Not all the communication networks including the communication network 10 need to be wired networks. That is, some or all of the communication networks may be wireless communication networks that transmit and receive information by radio.

The fabrication-order-receipt management control apparatus 14 has a body 16, and a user interface (UI) 18. The UI 18 includes a monitor 20 serving as a display, and a keyboard 22 and a mouse 24 each serving as an input operation unit.

The body 16 is connected with a media reader 26 that functions as an input source for ordering information required for placing a fabrication order.

The media reader 26 is provided with a slot that allows insertion of a recording medium 30 such as an SD memory. Ordering information recorded on the inserted recording medium is read and sent to the body 16.

Ordering information may be received from a PC 28 used for placing an order (to be sometimes also referred to as "ordering PC 28" hereinafter), which is connected to the communication network 10 and owned by the orderer. Although FIG. 1 depicts a single PC 28, the communication network 10 may be connected with multiple PCs 28.

The communication network 10 is connected with a control apparatus 34 that serves as a fabrication control apparatus owned by each of fabricated object manufacturers 32 that fabricate three-dimensional fabricated objects.

The control apparatus 34 manages multiple three-dimensional fabricators 36 (see FIGS. 3A to 3G) owned by individual fabricated object manufacturers 32. Although FIG. 1 depicts two fabricated object manufacturers 32 and their associated control apparatuses 34, the number of fabricated object manufacturers may be one, or three or more.

The multiple three-dimensional fabricators 36 are distinguished from each other according to the fabrication method employed (see three-dimensional fabricators 36A to 36G respectively illustrated in FIGS. 3A to 3G). When the three-dimensional fabricators 36 are to be generically referred to without regard to their fabrication method, each three-dimensional fabricator 36 will be referred to as "three-dimensional fabricator 36" or "3D printer 36".

Figure 2:
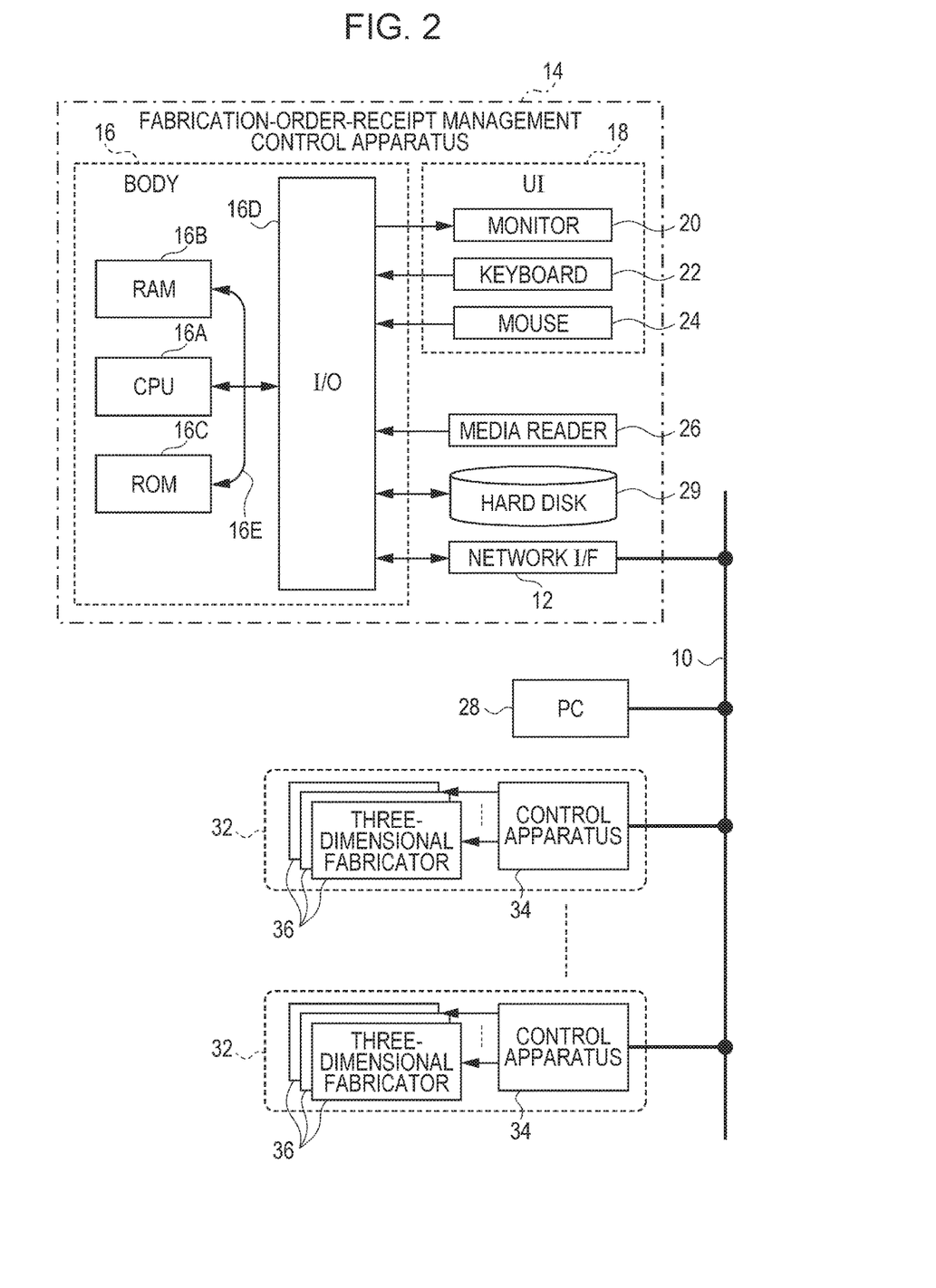
FIG. 2 is a block diagram illustrating a configuration of a fabrication-order-receipt management control apparatus according to the exemplary embodiment.

As illustrated in FIG. 2, the body 16 of the fabrication-order-receipt management control apparatus 14 includes a CPU 16A, a RAM 16B, a ROM 16C, an input/output unit 16D (I/O 16D), and a bus 16E that connect these components, such as a data bus or a control bus.

The I/O 16D is connected with a network I/F 12 that enables communication with the communication network 10, the UI 18 (the monitor 20, the keyboard 22, and the mouse 24), and the media reader 26.

The I/O 16D is also connected with a hard disk 29 serving as a large-scale recording medium. The hard disk 29 temporarily stores order-receipt management information related to a received fabrication order.

The ROM 16C stores a program for executing a fabrication-order-receipt management control. Upon activation of the fabrication-order-receipt management control apparatus 14, the program is read from the ROM 16C and executed by the CPU 16A. The fabrication-order-receipt management control program may be recorded on, other than the ROM 16C, the hard disk 29 or other recording media.

In the exemplary embodiment, the fabricated object manufacturers 32 have multiple kinds of three-dimensional fabricators 36 that employ different fabrication methods.

Examples of fabrication methods include binder jetting, directed energy deposition, material extrusion, material jetting, powder bed fusion, sheet lamination, and vat photopolymerization.

FIGS. 3A to 3G illustrate an exemplary relationship between the type and function of each fabrication method, and the material that is compatible with each fabrication method.

(1) Binder Jetting

Figure 3A:
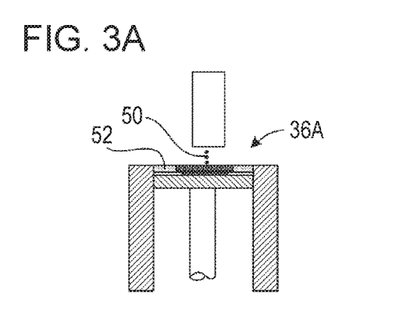
FIGS. 3A to 3G each schematically illustrate a three-dimensional fabricator that may be employed for the exemplary embodiment.

As illustrated in FIG. 3A, binder jetting employed by the three-dimensional fabricator 36A is a method with which a binder 50 in liquid form is jetted onto a powder bed 52 to selectively solidify the binder 50. Examples of materials used for this method include gypsum, ceramics, sand, calcium, and plastics.

(2) Directed Energy Deposition

Figure 3B:
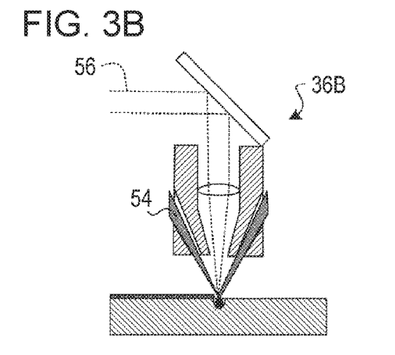

As illustrated in FIG. 3B, directed energy deposition employed by the three-dimensional fabricator 36B is a method with which, while a material 54 is fed, a beam 56 or other form of radiation is focused to control the location of heat generation for selective melting and fusing of the material 54. Examples of materials used for this method include metals.

(3) Material Extrusion

Figure 3C:
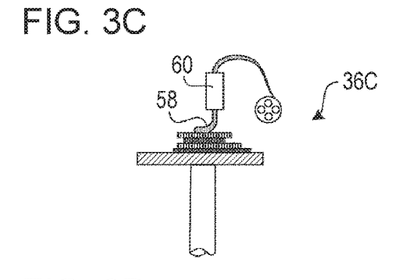

As illustrated in FIG. 3C, material extrusion employed by the three-dimensional fabricator 36C is a method with which a flowable material 58 is extruded from a nozzle 60 and solidified simultaneously with its deposition. Examples of materials used for this method include acrylonitrile butadiene styrene (ABS), polylactic acid (PLA), Nylon 12, polycarbonate (PC), and polyphenylsulfone (PPSF).

(4) Material Jetting

Figure 3D:
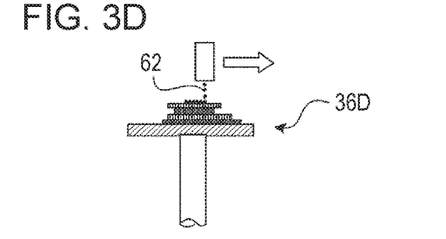

As illustrated in FIG. 3D, material jetting employed by the three-dimensional fabricator 36D is a method with which droplets 62 of material are jetted and selectively deposited and solidified. The three-dimensional fabricator 36D performs fabrication by using an inkjet method, which is a representative example of the material jetting method. Examples of materials used for this method include UV-curable resin, fat, wax, and solder.

(5) Powder Bed Fusion

Figure 3E:
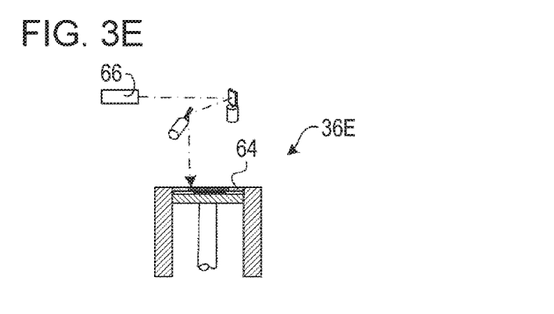

As illustrated in FIG. 3E, powder bed fusion employed by the three-dimensional fabricator 36E is a method with which a region 64 on which a layer of powder is laid is subjected to thermal energy radiated from a laser 66 to selectively melt and fuse the layer of powder. Examples of materials used for this method include engineering plastics, nylon, and metals.

(6) Sheet Lamination

Figure 3F:
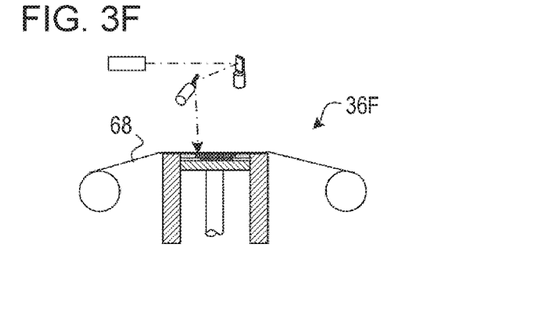

As illustrated in FIG. 3F, sheet lamination employed by the three-dimensional fabricator 36F is a method with which sheets of material 68 are bonded. Examples of materials used for this method include paper, resin sheets, and aluminum sheets.

(7) Vat Photopolymerization

Figure 3G:
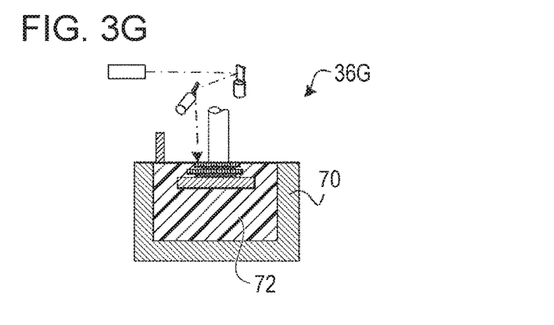

As illustrated in FIG. 3G, vat photopolymerization employed by the three-dimensional fabricator 36G is a method with which photo-curable resin 72 in liquid form stored in a tank 70 is selectively cured by photopolymerization. Examples of materials used for this method include UV-curable resin.

The seven three-dimensional fabricators 36A to 36G employing different fabrication methods described in (1) to (7) above are selectively owned by fabricated object manufacturers. Although FIGS. 3A to 3G illustrate fabrication methods described in (1) to (7) above, three-dimensional fabricators employing fabrication methods different from those described in (1) to (7) may be used.

When the fabrication-order-receipt management control apparatus 14 receives a fabrication request for a three-dimensional fabricated object from an orderer, the fabrication-order-receipt management control apparatus 14 selects a fabrication method.

The fabrication-order-receipt management control apparatus 14 stores, on the hard disk 29 (see FIG. 2), the relationship (a material/fabrication-method compatibility table) between individual materials and the fabrication methods (the three-dimensional fabricators described with reference to (1) to (7) above) compatible with these materials. For example, when a material is specified from the orderer, the fabrication-order-receipt management control apparatus 14 reads the material/fabrication-method compatibility table to select a compatible fabrication method.

The fabrication-order-receipt management control apparatus 14 determines which fabricated object manufacturer 32 owns the three-dimensional fabricator 36 that employs the selected fabrication method, and places a fabrication order with the control apparatus 34 managed by the corresponding fabricated object manufacturer 32.

When the control apparatus 34 of the fabricated object manufacturer 32 receives a fabrication request (including fabrication data, fabrication method, and the material used) for a three-dimensional fabricated object, the fabricated object manufacturer 32 fabricates the three-dimensional fabricated object by use of the three-dimensional fabricator 36. In some instances, the conditions used by the fabrication-order-receipt management control apparatus 14 to select a fabricated object manufacturer include delivery time and cost.

Figure 5A:
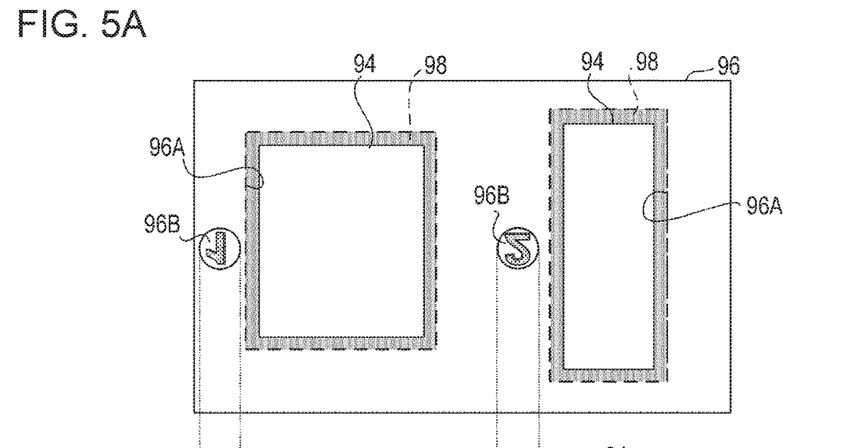
FIG. 5A is a top view.
Figure 5B:
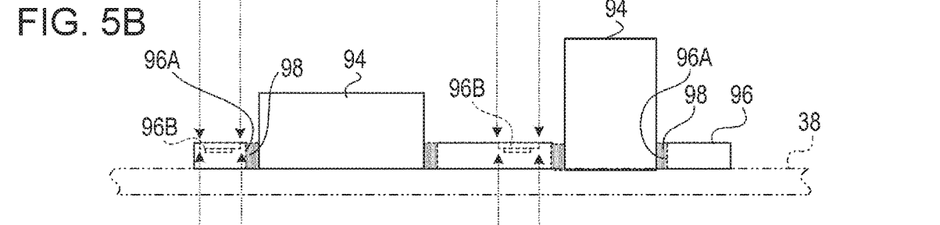
FIG. 5B is a side view.
Figure 5C:
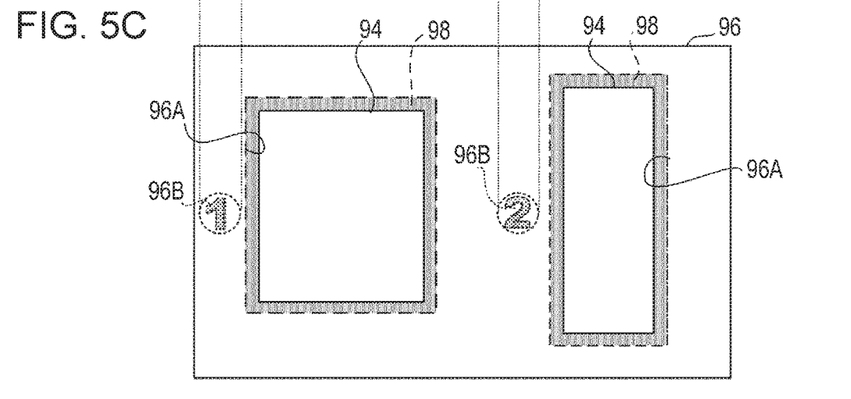
FIG. 5C is a bottom view.

According to the exemplary embodiment, a fabrication method (details of which will be described later) is established in which, if the content of a received order (order sheet information) represents a fabrication order for multiple components, that is, multiple first fabricated members (components) 94 that differ in shape as illustrated in FIGS. 5A to 5C, the first fabricated members (components) 94 are temporarily integrated by use of a second fabricated member (holding body) 96 and a third fabricated member (elastic layer) 98.

In the fabrication-order-receipt management control apparatus 14, upon receipt of a fabrication order for multiple first fabricated members (components) 94, the first fabricated members (components) 94 are laid out inside a predetermined region, and the region inside which the first fabricated members (components) 94 are laid out is designed as the second fabricated member (holding body) 96.

In designing the second fabricated member (holding body) 96, a gap in which to place the third fabricated member (elastic layer) 98 is provided between the first fabricated member (component) and the second fabricated member (holding body), more specifically, on the inner periphery of a through-hole 96A (see FIGS. 5A to 5C) that receives the first fabricated member (component) 94 formed in the second fabricated member (holding body) 96. Examples of materials that may be used for the third fabricated member (elastic layer) 98 include materials that have elasticity and whose surfaces do not exhibit adhesiveness upon drying following fabrication, such as rubber materials or foamed materials.

As a result, in response to a fabrication request for multiple first fabricated members (components) 94 having different shapes, a three-dimensional fabricated object made up of three kinds of fabricated members, that is, the first fabricated member (component) 94, the second fabricated member (holding body) 96, and the third fabricated member (elastic layer) 98, is to be fabricated.

Figure 4A:
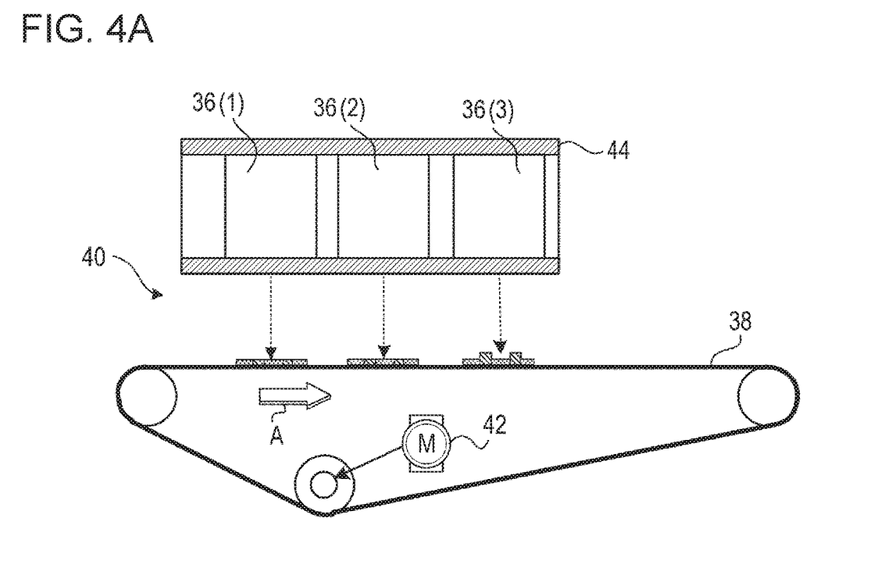
FIG. 4A is a front view of a composite fabrication unit according to the exemplary embodiment.
Figure 4B:
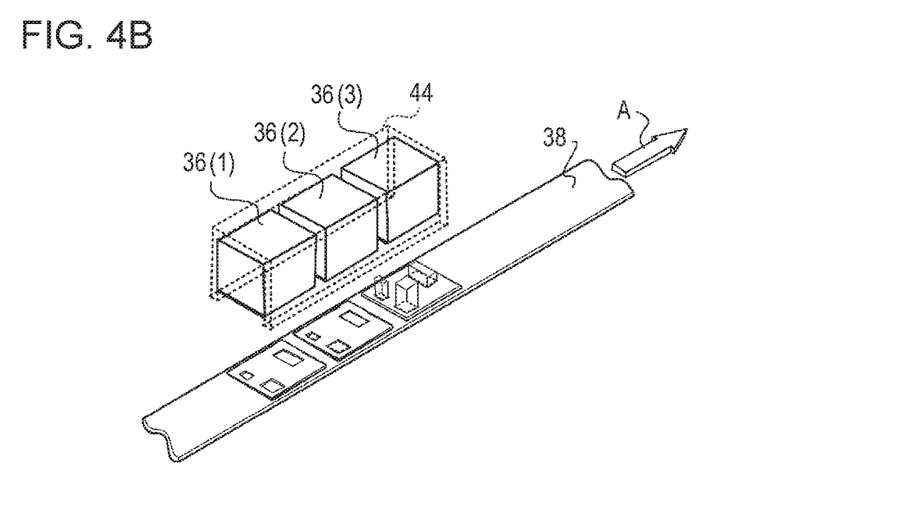
FIG. 4B is a perspective view of the composite fabrication unit illustrated in FIG. 4A.

For example, as illustrated in FIGS. 4A and 4B, at least one fabricated object manufacturer 32 includes a composite fabrication unit 40. The composite fabrication unit 40 includes a moving table (a belt conveyor 38) that sequentially moves between multiple three-dimensional fabricators 36 employing different fabrication methods.

As illustrated in FIG. 4A, the composite fabrication unit 40 includes the belt conveyor 38 (moving table) that serves as a reference plane during the fabrication process. The belt conveyor 38 is capable of moving (in the direction of an arrow A in FIG. 4A or in a direction opposite to this direction) with the driving force provided by a motor 42.

Multiple three-dimensional fabricators 36 (three-dimensional fabricators 36(1), 36(2), and 36(3) in FIGS. 4A and 4B) are arranged in the direction of movement of the belt conveyor 38, and attached to a head holder 44. As a result, as the belt conveyor 38 moves, a fabricated member may be transported between the three-dimensional fabricators 36. This enables selective fabrication of the first fabricated member (component) 94, the second fabricated member (holding body) 96, and the third fabricated member (elastic layer) 98.

Accordingly, with the exemplary embodiment, an operational process (fabrication workflows) is developed by taking into account a procedure for fabricating the third fabricated member (elastic layer) 98 in addition to the procedure for fabricating the first fabricated member (component) 94 and the second fabricated member (holding body) 96, and when the orderer passes an order for composite fabrication to a fabricated object manufacturer, the orderer attaches the fabrication workflows to the placed order.

Figure 6:
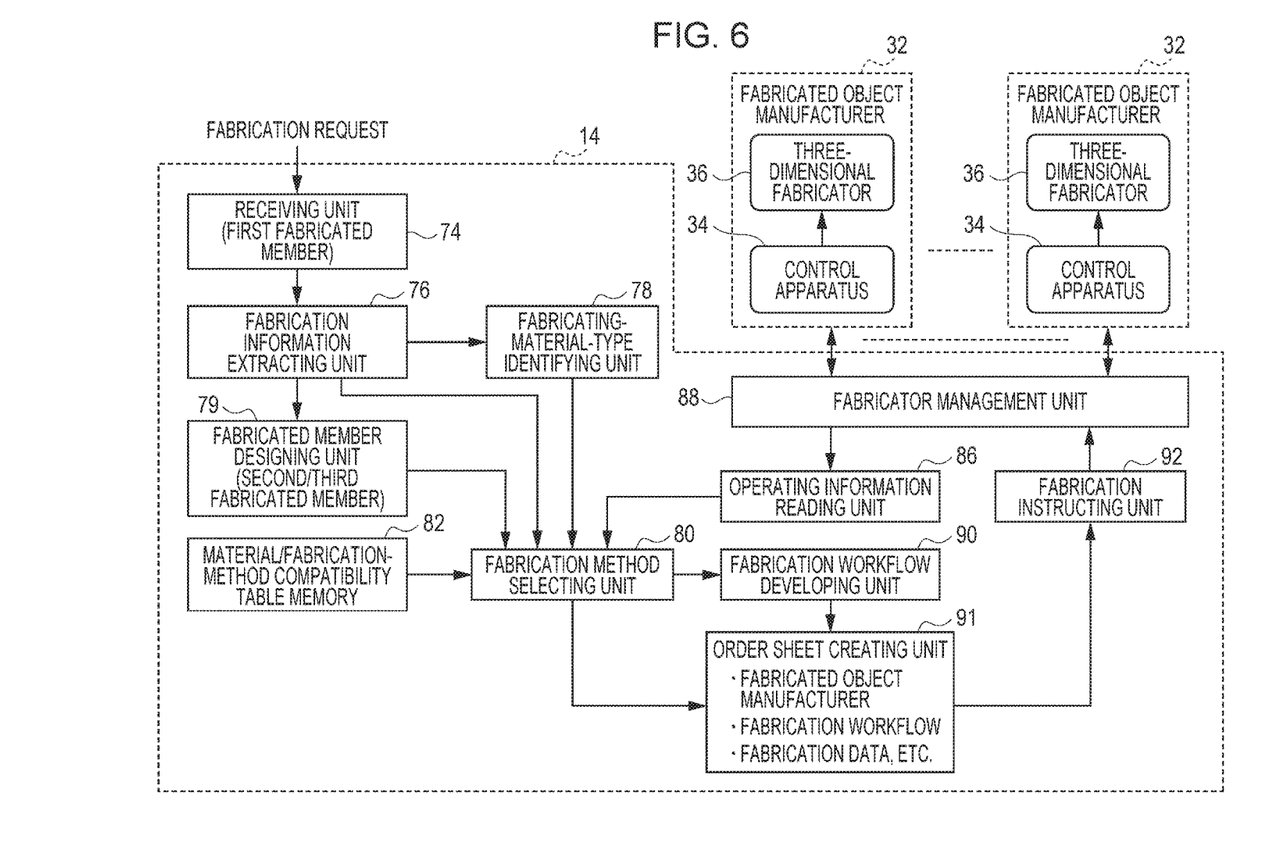
FIG. 6 is a functional block diagram according to the exemplary embodiment, illustrating in detail a process for executing a fabrication-order-receipt management control.

FIG. 6 illustrates functional blocks for executing a fabrication-order-receipt management control according to the exemplary embodiment, which is executed by the fabrication-order-receipt management control apparatus 14 (see FIG. 2) to provide a three-dimensional fabricated object through, in particular, composite fabrication performed in response to a fabrication request for multiple first fabricated members (components) 94 having different shapes. The blocks illustrated in FIG. 6 are not intended to limit the hardware configuration of the fabrication-order-receipt management control apparatus 14.

Although the fabrication-order-receipt management control apparatus 14 has the function of receiving a fabrication request including not only composite fabrication but also fabrication using a single material, and placing such a fabrication order with the fabricated object manufacturer 32, the following description of the function of the fabrication-order-receipt management control apparatus 14 will focus on the case of composite fabrication.

As illustrated in FIG. 6, a receiving unit 74 receives a fabrication request (a fabrication request for multiple first fabricated members (components) 94 in this case) from various locations at the orderer including the media reader 26 and the ordering PC 28. As for the wording of the term "fabrication request", this corresponds to "order placement" or "ordering" from the perspective of the orderer, whereas this corresponds to "order receipt" from the perspective of the receiving unit 74.

The receiving unit 74 is connected to a fabrication information extracting unit 76. The fabrication information extracting unit 76 extracts fabrication information about each first fabricated member (component) 94 from information about a fabrication request received by the receiving unit 74. Fabrication information includes fabrication format data, specified material, delivery time, and cost.

Desirably, the fabrication format data is voxel data saved in a fabricatable voxel (FAV) format.

Overview of FAV Format

The FAV format retains not only the outer structure of 3D model data but also information on a range of attributes such as those defining the internal structure, materials to be used, colors, and connection strength. The FAV format enables designers to design both the exterior and interior of 3D model data as desired, thoroughly down to the finest details in a precise and intricate manner, and then save this data.

The FAV format is constructed based on voxel data.

Voxels are the three-dimensional equivalents of pixel values. Similar to the way pixels as two-dimensional pixel values are arranged in a two-dimensional configuration to create an image, a three-dimensional fabricated object is structured by arranging voxels as three-dimensional pixel values in a three-dimensional configuration.

That is, the FAV format represents 3D model data satisfying the following conditions.

Condition 1: The information required for fabrication (e.g., shape, material, color, or connection strength) is clearly defined for each three-dimensional location, for both the exterior and interior of 3D model data.

Condition 2: The 3D model data allows the user to design (CAD), analyze (CAE), and inspect (CAT) the 3D model data seamlessly in an integrated and two-way manner without having to convert data.

As illustrated in FIG. 6, the fabrication information extracting unit 76 is connected to a fabricating-material-type identifying unit 78 and a fabricated member designing unit 79.

The fabricating-material-type identifying unit 78 identifies the type of material to be used in fabrication. The fabricating-material-type identifying unit 78 identifies the type of material of the first fabricated member (component) 94, and sends the identified material type to a fabrication method selecting unit 80.

The fabricated member designing unit 79 designs the second fabricated member (holding body) 96 and the third fabricated member (elastic layer) 98 from the fabrication information about the first fabricated member (component) 94.

The fabricated member designing unit 79 lays out multiple first fabricated member (components) 94 inside a predetermined region, and designs this region as the second fabricated member (holding body) 96. That is, the through-hole 96A for receiving the first fabricated member (component) 94 is to be provided inside the region.

Further, at the time of designing the second fabricated member (holding body) 96 described above, the third fabricated member (elastic layer) 98, which is to be provided between the first fabricated member (component) 94 and the second fabricated member (holding body) 96, is also designed.

Fabrication information about fabricated members designed by the fabricated member designing unit 79 is sent to the fabrication method selecting unit 80.

In designing the second fabricated member (holding body) 96, a component number assigned to each of the first fabricated members (components) 94 is recognized. To this end, a component-number assigning part 96B is provided at a position along the peripheral edge of the through-hole 96A that receives the first fabricated member (component) 94.

This enables the component number of each first fabricated member (component) 94 to be recognized with the first fabricated member (component) 94 being held by the second fabricated member (holding body) 96. In this case, if the second fabricated member (holding body) 96 is transparent, the component number may be recognized from the front and back sides. If the second fabricated member (holding body) 96 is non-transparent, the component-number assigning part may be provided on each of the front and back sides.

The fabrication method selecting unit 80 is connected with a material/fabrication-method compatibility table memory 82.

The fabrication method selecting unit 80 checks the material type identified by the fabricating-material-type identifying unit 78 against the material/fabrication-method compatibility table read from the material/fabrication-method compatibility table memory 82, and selects a fabrication method that is compatible with the identified material type (see the three-dimensional fabricators 36A to 36G in FIGS. 3A to 3G). The ability of the FAV format to retain information about materials facilitates selection of a suitable fabrication method.

The fabrication method selecting unit 80 is connected with an operating information reading unit 86. The operating information reading unit 86 receives operating information from a fabricator management unit 88, which manages fabrication performed by the three-dimensional fabricators 36 owned by multiple fabricated object manufacturers 32 (multiple control apparatuses 34), and sends the received information to the fabrication method selecting unit 80.

Accordingly, in selecting a fabrication method based on whether an object is to be fabricated from a single material or multiple materials, the fabrication method selecting unit 80 selects a fabrication method (and the fabricated object manufacturer 32 to which a fabrication request is to be made) by taking into account, in addition to the material/fabrication-method compatibility table, information about delivery time and cost received from the fabrication information extracting unit 76, as well as information about the current operating condition of the three-dimensional fabricator 36 received from the operating information reading unit 86. The fabrication method selecting unit 80 then sends information indicative of the selected fabrication method to a fabrication workflow developing unit 90 and an order sheet creating unit 91, which each serve as a generator. Desirably, the fabricated object manufacturer 32 is selected by taking factors such as fabrication method, delivery time, and price into account in addition to operating information.

The fabrication workflow developing unit 90 develops, in particular, a procedure to be followed by the composite fabrication unit 40 in fabricating a finished fabricated object through assembly of fabricated objects (components) made from multiple materials.

The fabrication workflow developing unit 90 develops workflows N (N represents the number of steps) made up of multiple steps, including information such as the direction in which the belt conveyor 38 is moved in FIGS. 4A and 4B. The developed workflows N are sent to the order sheet creating unit 91.

The order sheet creating unit 91 creates an order sheet based on the fabrication method (and the fabricated object manufacturer 32) selected by the fabrication method selecting unit 80 and the workflows N developed by the fabrication workflow developing unit 90.

The third fabricated member (elastic layer) 98 may be fabricated together with the first fabricated member (component) 94 and the second fabricated member (holding body) 96, or may be injected into a gap after fabrication of the first fabricated member (component) 94 and the second fabricated member (holding body) 96.

The order sheet creating unit 91, which is connected to a fabrication instructing unit 92 that functions as an instructing section, sends the created order sheet to the fabrication instructing unit 92.

As the fabrication instructing unit 92 instructs the fabricator management unit 88 to perform fabrication, the fabricator management unit 88 sends information related to the order sheet to the control apparatus 34 of the fabricated object manufacturer 32 that has been selected.

The operation of the exemplary embodiment will be described below with reference to the flowchart of FIG. 7.

Figure 7:
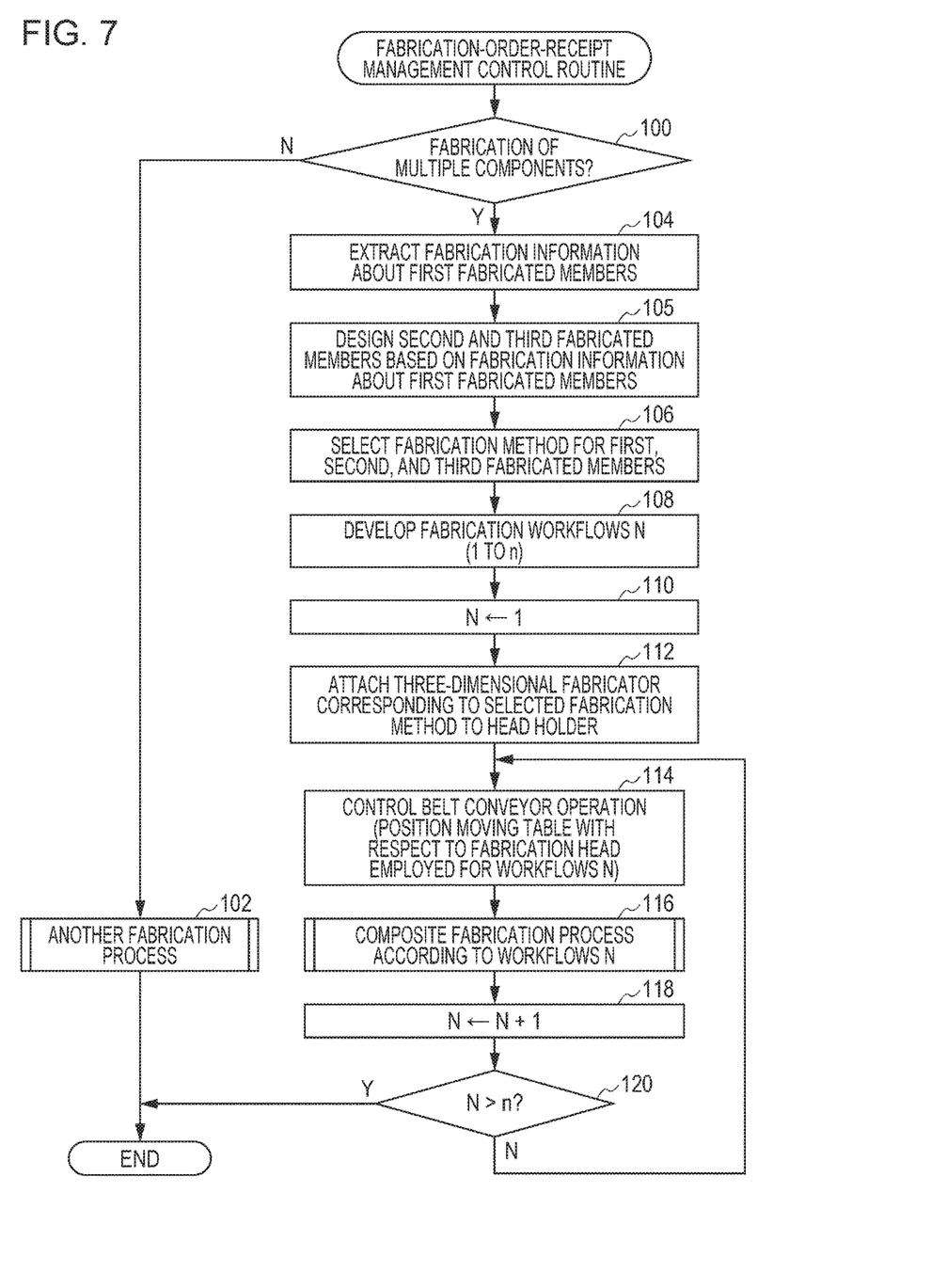
FIG. 7 is a flowchart illustrating a fabrication-order-receipt management control routine according to the exemplary embodiment.

FIG. 7 is a flowchart illustrating a fabrication-order-receipt management control routine executed by the fabrication-order-receipt management control apparatus 14 according to the exemplary embodiment upon receipt of a fabrication order.

At step 100, it is determined whether a received fabrication instruction is an instruction to fabricate multiple components. If the determination is negative, the process transfers to step 102 where another fabrication process is executed, and this routine is ended.

Examples of another fabrication process in this case include a fabrication process that uses a single material and a single three-dimensional fabricator 36 to fabricate a three-dimensional fabricated object, and a fabrication process that uses two or more types of materials or fabricators. A detailed description of such fabrication processes is herein omitted.

If the determination at step 100 is affirmative, the process transfers to step 104 where fabrication information is extracted from the received fabrication request. The extracted fabrication information represents fabrication information about the first fabricated member (component) 94.

When a fabrication order for multiple components is received, it is assumed that individual components are related to each other and handled as, for example, a single three-dimensional fabricated object, and that individual components are to be separated.

For example, in the case of molding, this is equivalent in concept to forming multiple components of a plastic model into an integrated molded object.

The fabrication information extracted at step 104 includes at least the following items of information: fabrication format data, specified material, delivery time, and cost. It is assumed that as the specified material, a material is directly specified in some cases, whereas in some other cases the material is specified by its texture (such as surface gloss or hardness), outward appearance (such as transparency), or other features.

At the next step 105, the second fabricated member (holding body) 96 and the third fabricated member (elastic layer) 98 are designed based on the fabrication information about each first fabricated member (component) 94.

That is, based on the fabrication information about multiple first fabricated members (components) 94, each of the first fabricated members (components) 94 is laid out to fit inside a specific region, and with each first fabricated member (component) 94 placed in the through-hole 96A, the shape of the region (specific region) around the through-hole 96A is designed as the second fabricated member (holding body) 96. Further, the third fabricated member (elastic layer) 98 is designed as a region that fills the gap created in the through-hole 96A in which the first fabricated member (component) 94 is received.

At the next step 106, a method for fabricating the first fabricated member (component) 94, the second fabricated member (holding body) 96, and the third fabricated member (elastic layer) 98 is selected, and then the process transfers to step 108.

At step 108, the fabrication workflows N for performing composite fabrication are developed. That is, in the case of the composite fabrication unit 40 illustrated in FIGS. 4A and 4B, the three-dimensional fabricators 36 to be attached to the head holder 44, and the sequence of movement of the belt conveyor 38 are determined as multiple workflows (1 to n). Then, the composite fabrication unit 40 executes a process corresponding to each individual workflow in an orderly sequence.

At the next step 110, a variable N representing a number given to a workflow is set to 1. Then, the process transfers to step 112 where, as a preparatory process, the three-dimensional fabricator 36 corresponding to the selected fabricated method is attached to the head holder 44, and then the process transfers to step 114.

At step 114, operation of the belt conveyor 38 (moving table) is controlled. Specifically, each fabricating location on the belt conveyor 38 is so positioned as to face the corresponding three-dimensional fabricator 36 employed for the workflows N (1 to n).

At the next step 116, a composite fabrication process is executed in accordance with a procedure indicated by the workflows N, and then the process transfers to step 118.

At step 118, N is incremented (N←N+1). Then, at step 120, N and n are compared to determine whether N is greater than n. In the determination at step 120 is negative (N≤n), it is determined that there are still remaining workflows N, and the process returns to step 114 to repeat the above-mentioned process.

If the determination at step 120 is affirmative (N>n), it is determined that composite fabrication has finished, and this routine is ended.

The fabricated object manufacturer 32 delivers the finished three-dimensional fabricated object to the orderer. This completes the series of steps for fabricating the three-dimensional fabricated object.

As described above, in the exemplary embodiment, the workflows N instructing which three-dimensional fabricator 36 is to be used in performing fabrication are developed, and the belt conveyor 38 is moved in accordance with the procedure specified by the workflows N. This leads to improved working efficiency at the fabricated object manufacturer 32 in comparison to cases where such fabrication workflows N do not exist.

Further, multiple first fabricated members (components) 94 are held by the second fabricated member (holding body) 96. This allows associated first fabricated members (components) 94 to be managed collectively, and also improves the ease with which the first fabricated members (components) 94 are conveyed in comparison to moving each individual first fabricated member (component) 94 separately.

Figure 8A:
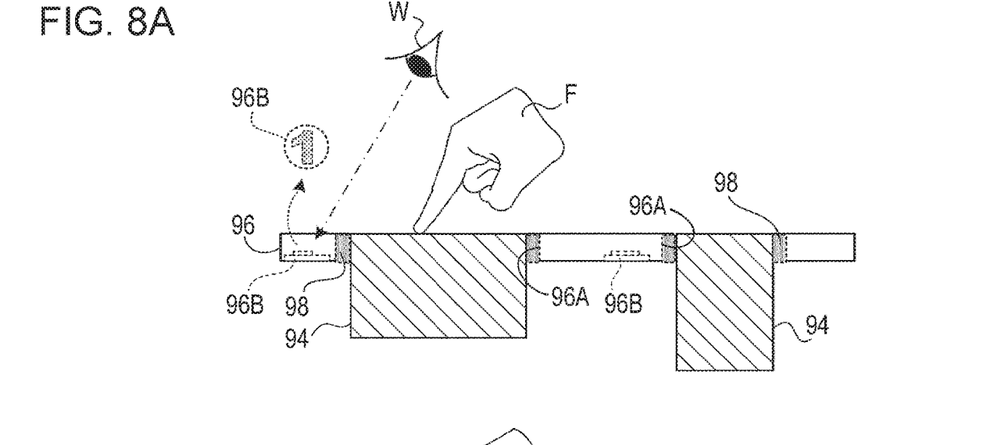
FIGS. 8A to 8C are side views of a three-dimensional fabricated object according to the exemplary embodiment, illustrating how a first fabricated member (component) is removed from the three-dimensional fabricated object.
Figure 8B:
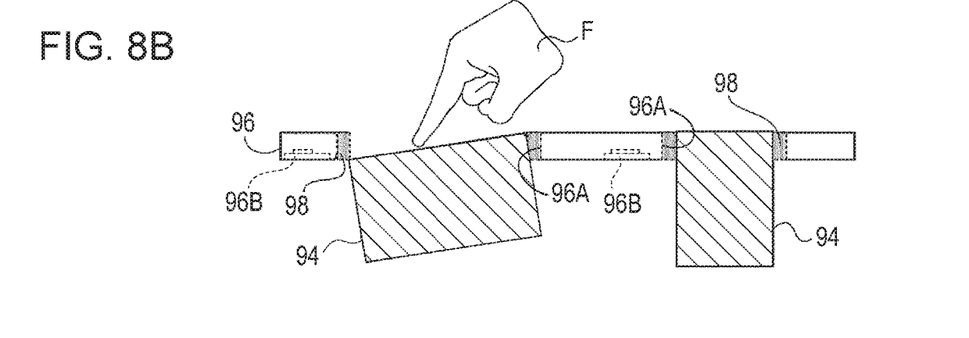
Figure 8C:
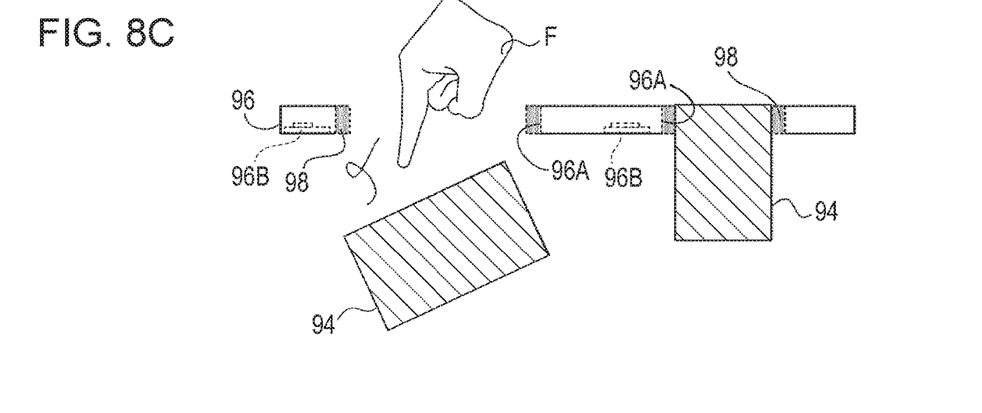

The presence of the third fabricated member (elastic layer) 98 enables the following operation. That is, when an operator W visually checks the component number of the component-number assigning part 96B and presses the first fabricated member (component) 94 with his or her finger F or other objects as illustrated in FIG. 8A, the first fabricated member (component) 94 held by the third fabricated member (elastic layer) 98 drops off against the elastic force of the third fabricated member (elastic layer) 98 as illustrated in FIG. 8B, allowing the first fabricated member (component) 94 to be separated as a discrete three-dimensional fabricated object as illustrated in FIG. 8C.

EXAMPLE

Figure 9A:
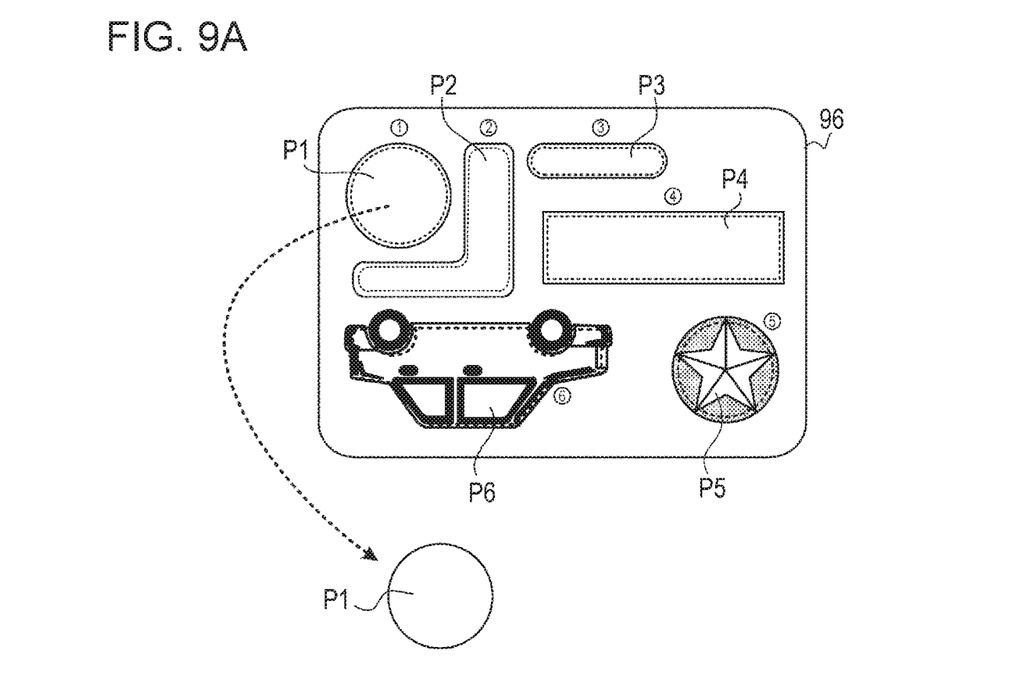
FIG. 9A is a top view of a plastic model fabricated in accordance with the exemplary embodiment.
Figure 9B:
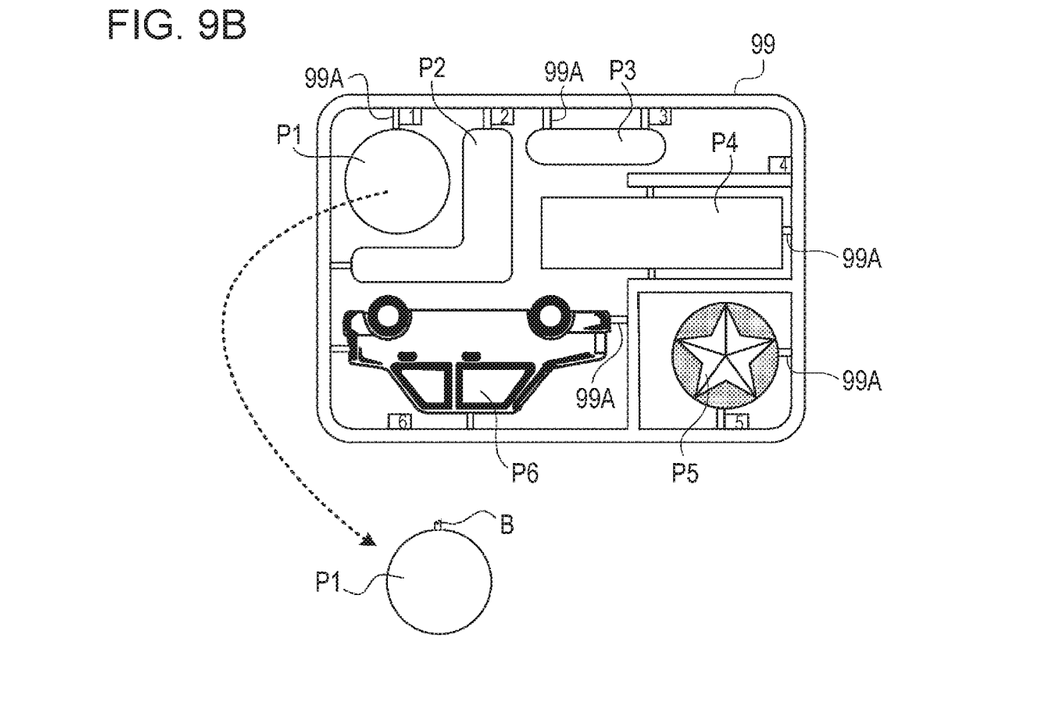
FIG. 9B is a top view of a plastic model formed integrally through molding according to a comparative example.

FIGS. 9A and 9B illustrate a comparison of how the components of a plastic model as an example of multiple components are held, between an example (see FIG. 9A) of a fabrication method according to the exemplary embodiment and a method based on molding (see FIG. 9B) according to a comparative example.

As illustrated in FIG. 9B, in accordance with the comparative example representing the molding-based method, multiple components P1 to P6 of the plastic model are integrally molded while being each attached to the distal end of a branch member 99A branching out from a frame-like member 99.

Accordingly, for example, when the component P1 is detached by using a cutting tool or by tearing off the component P1 with a hand, this causes traces B (burrs B) to occur. This necessitates additional post-processing such as scraping off the traces.

In contrast, according to the exemplary embodiment, the first fabricated member (component) 94 is held in the through-hole 96A with the third fabricated member (elastic layer) 98 therebetween. This configuration allows for easy removal when the first fabricated member (component) 94 is to be removed from the second fabricated member (holding body) 96, and no traces are left on the component P1 that has been removed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A fabrication management system comprising:
   a fabrication control apparatus including a composite fabrication unit that fabricates a plurality of fabricated members in a single process, and a controller that controls fabrication performed by the composite fabrication unit; and a fabrication management server including a designing section that, from fabrication information about a plurality of first fabricated members for which a fabrication request has been made, designs a second fabricated member that holds all of the first fabricated members in a removable manner, and an instructing section that instructs fabrication to be performed in accordance with fabrication procedure information, the fabrication procedure information indicating a procedure for obtaining a finished fabricated object by assembling together the first fabricated members and the second fabricated member, wherein data that identifies each of the fabricated members comprises voxel data saved in a fabricatable voxel (FAV) format.

* * * * *